(12) United States Patent
Lilja et al.

(10) Patent No.: US 12,484,592 B2
(45) Date of Patent: Dec. 2, 2025

(54) PEF SYSTEM FOR THE TREATMENT OF BIOLOGICAL MATERIAL

(71) Applicant: OPTICEPT TECHNOLOGIES AB, Lund (SE)

(72) Inventors: Per Lilja, Limhamn (SE); Nils Rhodin, Lund (SE)

(73) Assignee: OPTICEPT TECHNOLOGIES AB, Lund (SE)

(*) Notice: Subject to any disclaimer, the term of this patent is extended or adjusted under 35 U.S.C. 154(b) by 856 days.

(21) Appl. No.: 17/779,106

(22) PCT Filed: Nov. 27, 2020

(86) PCT No.: PCT/SE2020/051136
§ 371 (c)(1),
(2) Date: May 23, 2022

(87) PCT Pub. No.: WO2021/107853
PCT Pub. Date: Jun. 3, 2021

(65) Prior Publication Data
US 2022/0400711 A1    Dec. 22, 2022

(30) Foreign Application Priority Data
Nov. 28, 2019    (SE) .................... 1951368-8

(51) Int. Cl.
*A23L 5/30*    (2016.01)
*A23B 2/60*    (2025.01)
(Continued)

(52) U.S. Cl.
CPC .................... *A23B 2/60* (2025.01);
*A23L 5/30* (2016.08); *B65G 15/16* (2013.01);
*B65G 19/04* (2013.01); *B65G 2812/02871* (2013.01)

(58) Field of Classification Search
CPC .. A23B 2/60; A23L 5/30; B65G 15/16; B65G 19/04; B65G 2812/02871
(Continued)

(56) References Cited

U.S. PATENT DOCUMENTS 5,799,568 A * 9/1998 Warren ............... A47J 37/1214
                                                            210/DIG. 8
5,802,959 A   9/1998 Benson et al.
(Continued)

FOREIGN PATENT DOCUMENTS

CA    3051721 A1    8/2018
CA    3069907 A1    12/2018
(Continued)

OTHER PUBLICATIONS

Intended definition, https://www.merriam-webster.com/dictionary/intended, p. 1 (Year: 2009).*

(Continued)

*Primary Examiner* — Tiffany T Tran
(74) *Attorney, Agent, or Firm* — NovoTechIP International PLLC

(57) ABSTRACT

The present invention describes a PEF system (I) comprising a (channel 2) for PEF treatment of a material, opposite electrode units (3), (4) and at least one conveyor belt (5), wherein said at least one conveyor belt (5) is arranged in the channel (2), in between the opposite electrode units (3), (4) and in close proximity to one of these electrode units (3), (4), wherein said at least one conveyor belt (5) is perforated and/or comprises one or more PEF permeable sections, preferably is perforated, more preferably is a net.

13 Claims, 3 Drawing Sheets

Figure 1:
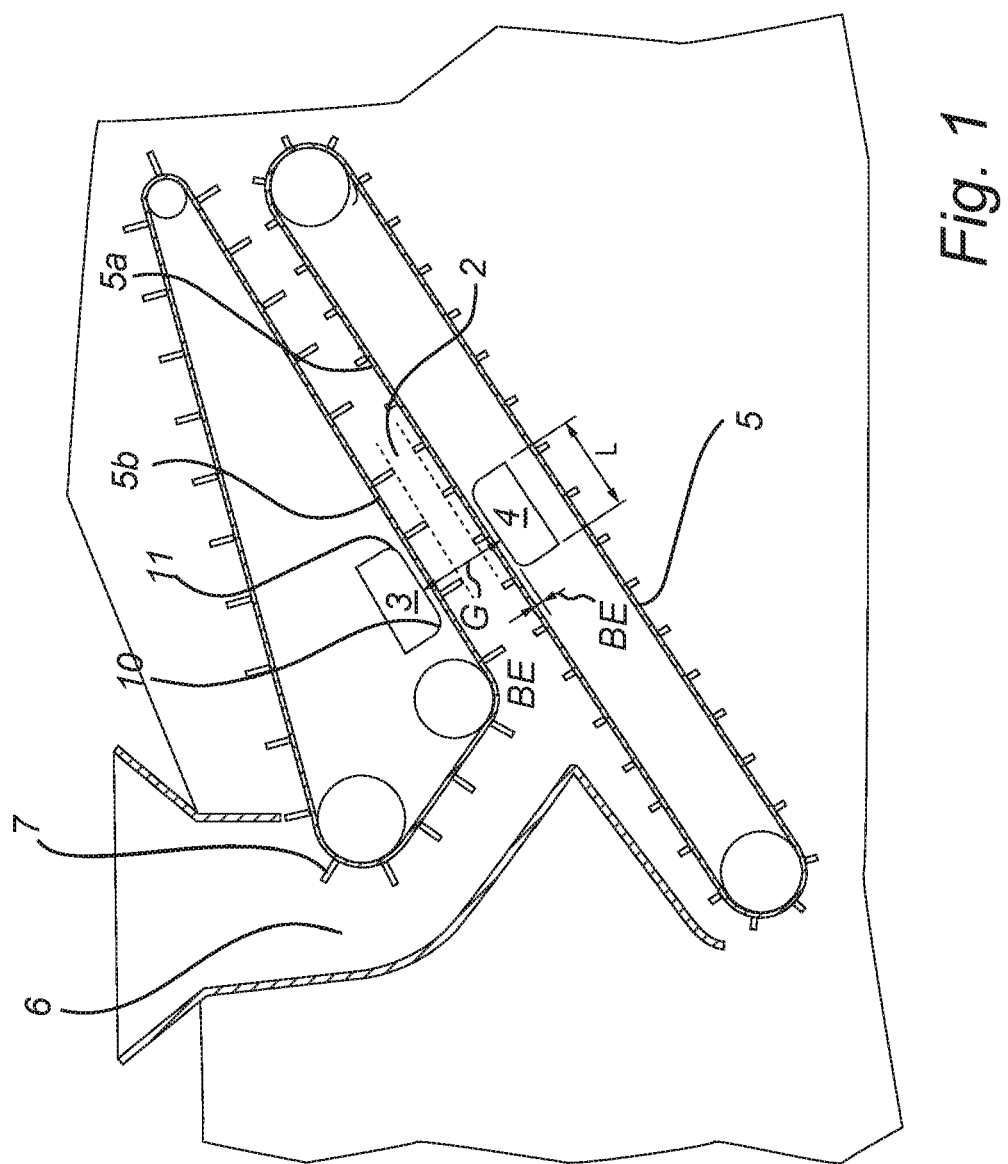

(51) Int. Cl.
*B65G 15/16* (2006.01)
*B65G 19/04* (2006.01)

(58) Field of Classification Search
USPC .......................................................... 99/451
See application file for complete search history.

(56) References Cited

U.S. PATENT DOCUMENTS

| | | | |
|---|---|---|---|
| 2001/0017082 A1* | 8/2001 | Morshuis | A23B 2/60 99/451 |
| 2004/0166019 A1 | 8/2004 | Schultheiss | |
| 2005/0005611 A1* | 1/2005 | Owada | F25D 17/042 62/264 |
| 2010/0209578 A1* | 8/2010 | Fredlund | F26B 17/026 426/456 |
| 2016/0015076 A1* | 1/2016 | Goto | A23B 2/60 99/451 |
| 2017/0035078 A1 | 2/2017 | Biglione et al. | |
| 2018/0368451 A1 | 12/2018 | Bhaskar et al. | |

FOREIGN PATENT DOCUMENTS

| | | | |
|---|---|---|---|
| DE | 3911959 A1 * | 5/1990 | ............ D01G 99/00 |
| DE | 102008024065 A1 * | 11/2009 | ............ A23N 1/006 |
| EP | 2941968 A1 | 11/2015 | |
| EP | 2895014 B1 | 3/2019 | |
| WO | 2016171610 A1 | 10/2016 | |
| WO | 2017184066 A1 | 10/2017 | |

OTHER PUBLICATIONS

Search Report issued Apr. 22, 2020 in Sweden Application SE 1951368-8.
Kempkes, M.A. 'Industrial Pulsed Electric Field Systems', [online], [Retrieved on Dec. 9, 2020], Handbook of Electroporation, D. Michlavcic, Springer International Publishing AG 2017, DOI: 10,1007/ 978-3-319-26779-1_211-1, Retrieved from the internet: <URL: http://divtecs.aspiresoft.com/data/Root/AlgaeEPPublished2.pdf>; Seep. 4, section PEF system overview—p. 14, lines 1-3.
Toepfi, S. 'Pulsed Electric Fields (PEF) for Permeabilization of 1-18 Cell Membranes in Food- and Bioprocessing: Applications, Process and Equipment Design and Cost Analysis'. 2006, [online], [Retrieved on Dec. 9, 2020-], Fakultat 111-Prozesswissenschaften der Technischen Universitat Berlin zur Erlangung des akademischen Grades, DOI: 10.14279/depositonce-1441, Retrieved from the internet: <URL: https://depositonce.tu-berlin.de/bitstream/11303/1738/1/Dokument_ 49.pdf>; Seep. 25-38, section 2.6-2.8; p. 44-47, section 3.2.
Product Brief PowerModTM Industrial-Grade Pulsed Electric Field System, 2016, [online], [Retrieved on Dec. 8, 2020], Retrieved from the internet: <URL: http://divtecs.aspiresoft.com/data/File/papers/ Data%20Sheets%202016/PEF%201nd ustrial%20 Data%20Sheet% 20Web%202 016.pdf?rev= 3A62>; Seep. 2.
International Search Report issued Dec. 15, 2020 in PCT/SE2020/ 051136.

* cited by examiner

PEF SYSTEM FOR THE TREATMENT OF BIOLOGICAL MATERIAL

FIELD OF THE INVENTION

The present invention relates to a PEF (pulsed electric field) system for the treatment of biological material, such as e.g. vegetables, such as carrots, salad or e.g. cuttings.

TECHNICAL BACKGROUND

There are existing PEF systems for the treatment of biological materials. For instance, in WO2016/171610 there is disclosed a PEF (pulsed electric field) chamber comprising a tube with two open ends having attachment means enabling the PEF chamber to be a plug-in device, wherein the tube has a length L from one open end to the other open end and an inner width IW from one side of the tube to the other side of the tube in a cross section being perpendicular to the length L thereof, wherein the tube has a geometrical narrowing of the inner width IW somewhere along the length L of the tube. Moreover, in WO2017/184066 there is disclosed a similar PEF system as according to above, however in this case the PEF system comprises insertable electrode units.

One aim of the present invention is to provide a PEF system which enables to PEF treat a biological material in an efficient manner but at the same time at a comparatively low voltage applied.

SUMMARY OF THE INVENTION

The stated purpose above is achieved by a PEF system comprising a channel for PEF treatment of a material, opposite electrode units and at least one conveyor belt, wherein said at least one conveyor belt is arranged in the channel, in between the opposite electrode units and in close proximity to one of these electrode units, wherein said at least one conveyor belt is perforated and/or comprises one or more PEF permeable sections. According to one specific embodiment, said at least one conveyor belt is perforated. According to another specific embodiment of the present invention, the conveyor belt is a net. As seen in inter alia the figures, perforated belts may be arranged as at least two conveyor belts between the opposite electrode units and in close proximity to one electrode unit each. Such embodiments are shown in the figures.

The present invention provides several benefits. By providing the conveyor belt as restrictor between the material to be treated and an electrode it is possible to control the treatment environments. First of all, hot spots with very high electric fields (e-fields) also providing spaces with high temperatures may be prevented. This is an important aspect when providing a homogenous e-field, which in turn gives the basis for a high level of control and efficiency when PEF treating a material. Secondly, the conveyor belt incorporated in the PEF system according to the present invention also provides an effective transportation means during the treatment. The material to be treated is flown in a liquid, suitably an aqueous liquid, in the PEF system according to the present invention. To enable a controlled transportation of the material to be treated through the PEF system and up to and through the treatment zone, i.e. between the opposite electrodes, is important. The incorporation of one or more conveyor belts such as according to the present invention enables an effective way of both transporting and treating a biological material, e.g. carrots or cuttings, in an aqueous transportation system, i.e. ensuring a high product/water ratio when PEF treating a material. This is important because if the product/water ratio is high, then it requires a lower flow through the machine, which requires lower PEF power and the solution becomes more efficient, less complicated and less costly.

With reference to known methods, the following may be mentioned. For instance, in US 2017/0035078 there is described a method and system for producing potato chips where whole or sliced potatoes are subjected to pulsed electric field treatment. Moreover, in US 2018/0368451 there is disclosed a method and system in which raw fruits or vegetables are pre-treated prior to atmospheric frying, where the pre-treatment includes application of a pulsed electric field to the raw products followed by slicing and immediate blanching in a water solution of above 145° F. in a turbulent environment. Furthermore, in EP 2941968 there is disclosed a device for the electroporation of potatoes, said device comprising a treatment chamber comprising a conveyor belt submerged in a liquid, a pulse generator, and at least two electrodes mounted in, or close to, the insulating pipe wall of the treatment chamber; where said treatment chamber is arranged to receive whole potatoes in solid phase transported, with or without a liquid transport carrier, past at least two electrodes.

The PEF system according to the present invention, however, differs from the systems and methods above in several aspects, one important being in that said at least one conveyor belt is perforated or comprises one or more PEF permeable sections according to the present invention. This is not shown or hinted in any of the documents mentioned above. According to the present invention, the perforation or PEF permeable section(s) of said at least one conveyor belt is important to provide for an efficient PEF treatment.

SPECIFIC EMBODIMENTS OF THE INVENTION

Below some specific embodiment of the present invention are disclosed and further presented.

As mentioned above, the PEF system according to the present invention comprises at least one conveyor which is perforated, such as having a net configuration, or by other means comprises one or more PEF permeable sections. PEF permeable sections are such where the material of the conveyor belt allows for PEF treatment through the material.

As mentioned, according to one embodiment of the present invention, said at least one conveyor belt is perforated, preferably is a net. The material used in the conveyor belt should enable for PEF treatment through the same. This implies that the material should be permeable, either the material as such or by being perforated or the like. Moreover, the material used suitably is non-conductive. Furthermore, the material suitably also has a high degree of permeability so that the material to be PEF treated is not shaded so the treatment becomes homogenous. In this context it may be mentioned that according to one specific embodiment of the present invention, said at least one conveyor belt is perforated, preferably is a net, with an area of holes which is at least 40% of the total area of the conveyor belt.

Moreover, in relation to the above it should also be said that the perforation of said at least one conveyor belt according to the present invention may come in many forms and in different type of PEF system arrangements according to the invention. First of all, holes providing for the perforation may have any type of shape. Secondly, in a PEF system according to the present invention it should be noted that any type of arrangement where the opposite electrodes are provided on each side of a conveyor belt is possible. This further implies that with only one conveyor belt according to the present invention one electrode may be arranged without being covered by a belt or net.

Moreover, it should be noted that different type of conveyor belts may be combined in a PEF system according to the present invention, such as where one conveyor belt is perforated and another one comprises PEF permeable sections.

Furthermore, the holes creating the perforation does not have to be physical. Such PEF permeable sections may be provided by means of a suitable material of the conveyor belt. As another such example, the holes may be electrical holes instead. This is a possible arrangement if the conveyor belt is made of metal. A metal conveyor belt, however, generates two problems. The first is that the conveyor belt might cause an electrical danger and the second is that the created e-field will be less efficient. To overcome these problems the conveyor belt may be arranged with "metal-sections" that are connected by isolating parts. Only the "metal-sections" that are close to the electrodes would generate an e-field if the isolating parts are isolating enough. Such electrical holes may also be regarded as PEF permeable sections of the conveyor belt.

Moreover, the conveyor belt should also be thin to ensure that voltage is not being lost during the PEF treatment. Therefore, according to one specific embodiment of the present invention, said at least one conveyor belt has a thickness in the range of 0.5-5 mm, preferably in the range of 0.5-2 mm.

Furthermore, one very suitable material to be used for the conveyor belt(s) is a perforated thin net, which net is built up by a thin wire, e.g. with a thickness in the ranges mentioned above. Such a net provides all suitable benefits stated above as well as provides a very low shading effect when the wire used is very thin.

Also the channel for the PEF treatment and its geometry is of interest in relation to the present invention. According to one specific embodiment of the present invention, the channel for PEF treatment of a material is a longitudinal channel and wherein each of the opposite electrodes is arranged on one side each of the channel when viewed in a cross section from the side. One example of this type of geometry is clearly shown in the figures.

Moreover, according to yet another specific embodiment of the present invention, the PEF system also comprises an inflow channel intended to receive material to be treated, and wherein the inflow channel is in flow contact with the channel for PEF treatment of a material. These possible different flow channel parts of a common channel for inflow and treatment are shown with some possible examples in the figures. From here it is also possible to see examples of the different directions when comparing the inflow direction in comparison to the outflow direction of the PEF system according to the present invention. In this context it may be mentioned that according to one specific embodiment of the present invention, the inflow channel continues into the channel for PEF treatment of a material with a changed geometrical direction, preferably wherein the inflow channel has a substantially vertical direction or an inclined vertical direction and wherein the channel for PEF treatment of a material is inclined upwards when continuing from the inflow channel.

In relation to the geometry and directions of the channel and the positions of the opposite electrodes, several aspects may be mentioned according to the present invention. Firstly, the electrodes should be positioned under water. Here sharp channel angles may be used to provide a comparatively small device. On the other hand, with sharp channel angles, such as when the inflow channel part continuous into the treatment channel there is always an evident risk that material to be treated gets stuck. One possibility according to the present invention is to incorporate different inner diameters when continuing from the inflow channel into the treatment channel part.

Furthermore, also setting the ranges of the angles of inclination of the channel parts may be a way to optimize according to the present invention, or at least to limit the problem mentioned above. According to one specific embodiment, the angle of inclination of the inflow channel is in the range of 30-60 degrees, e.g. around 45 degrees. Furthermore, according to yet another specific embodiment of the present invention, the angle of inclination of the treatment channel, or outflow channel as it may also be called, is in the range of 15-45 degrees, such as around 30 degrees. As may be understood from above, it is according to the present invention suitable that the angle of inclination of the treatment channel is lower than the angle of inclination of the inflow channel. This provides at least a little less sharp bent in the bottom of the entire channel.

According to one preferred embodiment, the PEF system comprises at least two conveyor belts and where each conveyor belt is arranged in between the opposite electrode units and in close proximity to one electrode unit each. The configuration here may vary, however the most important aspect is that each conveyor belt is arranged or "belongs to" one electrode each. As may be seen in the figures, the PEF system according to the present invention may comprise a lower conveyor belt and an upper conveyor belt. Moreover, the upper conveyor belt may be arranged as the only conveyor belt to transport material to be treated in the inflow channel. Therefore, according to one specific embodiment of the present invention, a second conveyor belt is arranged to transport material to be treated in the inflow channel and in the channel for PEF treatment of a material.

As should be understood from above, the PEF system according to the present invention may also comprise only one single conveyor belt, at least with reference to only the transportation of material to be treated in the channel for PEF treatment. Therefore, according to one specific embodiment of the present invention, the PEF system comprises one single conveyor belt at the position intended for PEF treatment. According to yet another embodiment of the present invention, said single conveyor belt is arranged over one single rotational wheel. This also implies that the conveyor belt is arranged around this rotational wheel, without the need of additional rotational wheels. As an example, this may be suitable when the conveyor belt is arranged as an upper conveyor belt. Therefore, according to one embodiment, said single conveyor belt is arranged as an upper conveyor belt in relation to the channel for PEF treatment of a material. When the material to be treated is floating on the surface of the liquid then the conveyor belt and transportation means is suitably arranged as an upper construction ensuring to press down the material into the liquid and/or to press down pieces of the material so that they are organized in relation to each other. This provides for a more efficient PEF treatment of the material.

In a single and upper conveyor belt arrangement according to the present invention, then the channel for treatment may be regarded as having three walls, such as with an open tube or U shape, or the like. The upper conveyor belt is then arranged as an upper unit to ensure that the material to be treated is transported along the channel. Again, electrodes are fixedly arranged opposite each other to enable for the PEF treatment.

With reference to the above it may be said that provision of PEF treatment through the transportation channel, such as according to the present invention, enables lower voltage usage of the PEF generator at the same time as the possibility of a wide transportation belt and/or a wide wheel enabling transportation of the material to be treated.

It should be noted that the present invention also embodies alternatives where both a first conveyor belt, such as a lower conveyor belt, and a second conveyor belt, such as an upper conveyor belt, are arranged to transport material through both the inflow channel part as well as the treatment channel part, e.g. through more or less the entire channel from an inflow to an outflow. One such alternative is exemplified in FIG. 3 where the lower conveyor belt has a V shape and where the upper conveyor belt has a triangular shape or the like.

Furthermore, in relation to the above it should also be noted that active transportation of the material to be treated may be accomplished by different means, such as pumping by means of one or more pumps, other forms of driving mechanisms like pistons or the like. This further implies that with the incorporation of a perforated conveyor belt according to the present invention, this conveyor belt may enable transportation of the material in different ways, and not only be means of rotation of the conveyor belt in itself.

Moreover, according to yet another specific embodiment of the present invention, said at least one conveyor belt has paddles. As seen in the figures, when there is arranged two conveyor belts suitably both have paddles. Moreover, the paddles may vary in length and shape, such as e.g. a length in the range of 2-20 cm, for instance in the range of 3-15 cm. Furthermore, the shapes of the paddles comparatively on a first conveyor belt versus a second conveyor belt may be different. As an example, on an upper conveyor belt it may in some cases be of interest to have longer paddles than the paddles arranged on a lower conveyor belt.

Furthermore, scrapers are suitably also arranged at all rollers of the belts. Moreover, air-knives are also beneficial to incorporate on the belts to ensure to remove material going back into the apparatus.

Also the electrodes may be of a certain configuration according to the present invention. Therefore, according to one specific embodiment of the present invention wherein the opposite electrodes have at least one rounded edge, preferably wherein at least a front electrode edge is rounded, preferably wherein both a front electrode edge is rounded and wherein a rear electrode edge is rounded. When viewing the figures one possibility is shown where both a front electrode edge and a rear electrode edge are rounded. The electrode edges are rounded in a perpendicular direction to the flow direction. This implies that material to be treated is prevented from being brought into contact with a sharp electrode edge. Such electrode edges bring about corner effects which in turn establish a higher risk for hot spots with high e-fields.

The PEF system according to the present invention provides several benefits and solves several possible issues. The PEF system according to the present invention both provides a streamlined channel without any obstacles for the material to be treated when being forced through the treatment channel, and which at the same time eliminates or diminishes the risk of hot spots in the provided e-field between the electrodes. The latter is ensured by having the conveyor belts at a distance from the electrodes, which in turn ensures that the biological material is not in direct contact with the electrodes. Moreover, by also arranging the electrodes with rounded edges, at least a rounded edge at a front, i.e. at the inflow side between the electrodes, but preferably also at a rear edge, possible corner effects are diminished even further. Without rounded electrode edges problems will arise eventually. Such problems may be overloads, effect losses, uneven treatment or a higher or extreme wear of the corners of the electrodes. Such wear may over time provide other problems, such as uneven treatment or material getting stuck at certain positions. All of these problems are avoided according to the present invention, where the PEF system comprises conveyor belts to ensure a certain distance between the material to be treated and which preferably also comprises opposite electrodes with rounded edges diminishing potential corner effects (hot spot problems). A controlled even e-field may be obtained with a PEF system according to the present invention, which also ensures an efficient flow-through mechanism for the material to be PEF treated between the electrodes.

Furthermore, the PEF system according to the present invention is very effective for the treatment of solid products, such as carrots or cuttings or the like, as these may be compacted at a very high level in the treatment channel well at the same where a homogenous e-field is provided between the opposite electrodes for the actual PEF treatment. To diminish the risk of hot spots is important as such may harm cuttings or other material types intended to be treated. Furthermore, the PEF system according to the present invention provides a high product/water ratio, which is possible based on several of the features mentioned above.

Besides all aspects mentioned above, also different measures and distances within the PEF system may be of importance inside the system. According to one specific embodiment of the present invention, the opposite electrode units have at least one rounded edge with a radius in a range of 0.1-0.5 of a distance G between the opposite electrode units, preferably wherein the opposite electrode units have a front electrode edge and a rear electrode edge with a radius in a range of 0.1-0.5 of a distance G between the opposite electrode units. This level of the radius in relation to the gap G between the opposite electrodes is one relationship which may be of interest according to the present invention. Furthermore, according to yet another specific embodiment of the present invention, a distance G between the opposite electrode units is in the range of from 5-40 cm. In addition to the gap distance, also the electrode length may be of importance. Therefore, according to yet another embodiment of the present invention, each of the opposite electrode units has a length L, said length L being arranged in the longitudinal direction of the channel, and wherein the length L is in the range of 5-80 cm. According to one embodiment the length L is in the range of 2-4 G. Moreover, as may be understood from above, the electrodes incorporated according to the present invention are suitably longitudinal in shape, i.e. with rounded edges.

Moreover, also a distance between the electrodes to the conveyor belts is of relevance. According to one specific embodiment of the present invention, distance BE between said at least one conveyor belt and an electrode unit in close proximity to said at least one conveyor belt is maximum 0.1 G where G is a distance between the opposite electrode units, preferably maximum 0.05 G, more preferably maximum 0.01 G. To arrange a distance between the electrodes and the conveyor belts ensures a homogenous e-field, however the distance should not be too large as this lowers the efficiency. As should be clear from above, the mentioned distance BE may be the same between each electrode and the corresponding conveyor belt.

Moreover, also the depth of the electrodes may be of relevance. Therefore, according to one specific embodiment of the present invention, the opposite electrode units have a depth D perpendicular to a length L, and wherein the depth D is in the range of from 5-100 cm, preferably in the range of 20-50 cm.

Furthermore, the PEF system according to the present invention may also comprise other units. One example is one or more sensors. As an example, according to one embodiment of the present invention there is arranged one or more sensors detecting the volume or amount of products intended to be treated. For instance, when treating carrots this may be an efficient way to measure and if need alter the amount flowing into the channel where the PEF treatment is made.

As described above, the PEF system according to the present invention has several benefits. The PEF system enables to PEF treat a biological material in an efficient manner but at the same time at a comparatively low voltage applied. The system according to the present invention provides solutions and embodiments with reference to handling both high product density, rounded electrode edges, homogenous treatment, wide conveyor belts, and short distance between the electrodes in one and the same invention concept.

DETAILED DESCRIPTION OF THE DRAWINGS

In FIG. 1 there is shown a PEF system 1 according to one specific embodiment of the present invention. The PEF system 1 comprises a channel 2 for PEF treatment of a material, in which treatment channel 2 there are opposite electrode units 3, 4. Furthermore, the PEF system 1 also comprises Two conveyor belts 5, namely a lower such 5a and an upper conveyor belt 5b. Both these conveyor belts 5a, 5b are provided in close proximity to electrodes 3, 4. Moreover, both conveyor belts 5a, 5 have paddles 7.

Furthermore, the PEF system 1 also comprises an inflow channel 6 intended to receive material to be treated. As notable, the inflow channel 6 is in flow contact with the treatment channel 2. Moreover, the inflow channel (6) has a substantially vertical direction which continuous in an inclined vertical direction and wherein the treatment channel 2 is inclined upwards when continuing from the inflow channel 6.

Furthermore, the opposite electrodes 3, 4 have a rounded front electrode edge 10 and a rounded rear electrode edge 11.

Moreover, depicted is also a distance G between the opposite electrode units 3, 4, the length L of the electrodes, and the distance BE between the conveyor belts 5a, 5b and each electrode, respectively.

Figure 2:
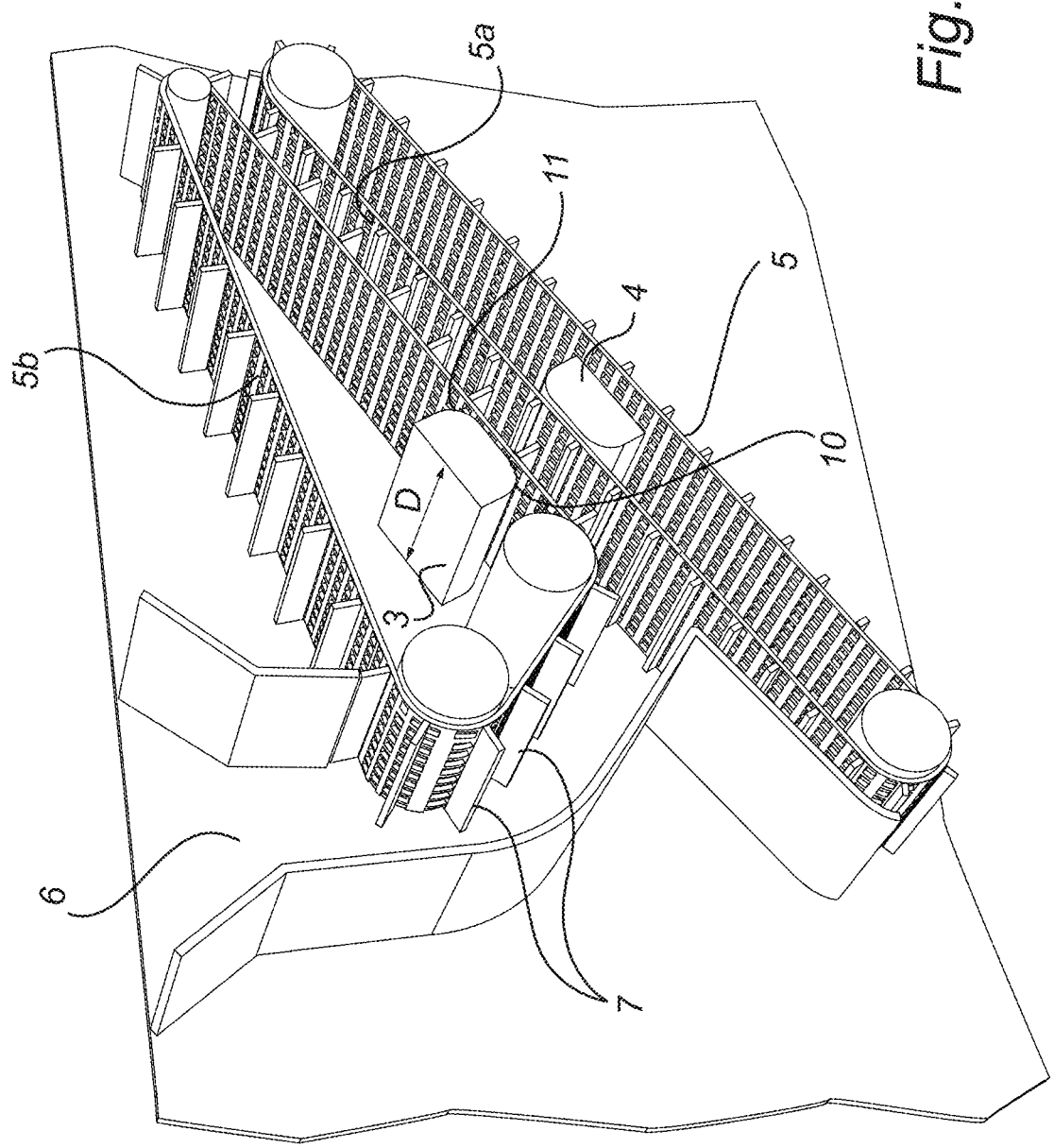

In FIG. 2 there is shown a similar embodiment as shown in FIG. 1. In this embodiment both the lower conveyor belt 5a and the upper conveyor belt 5b are made of net based material which as such is permeable. Furthermore, in FIG. 2 the depth D perpendicular to a length L of the electrodes is also shown.

Figure 3:
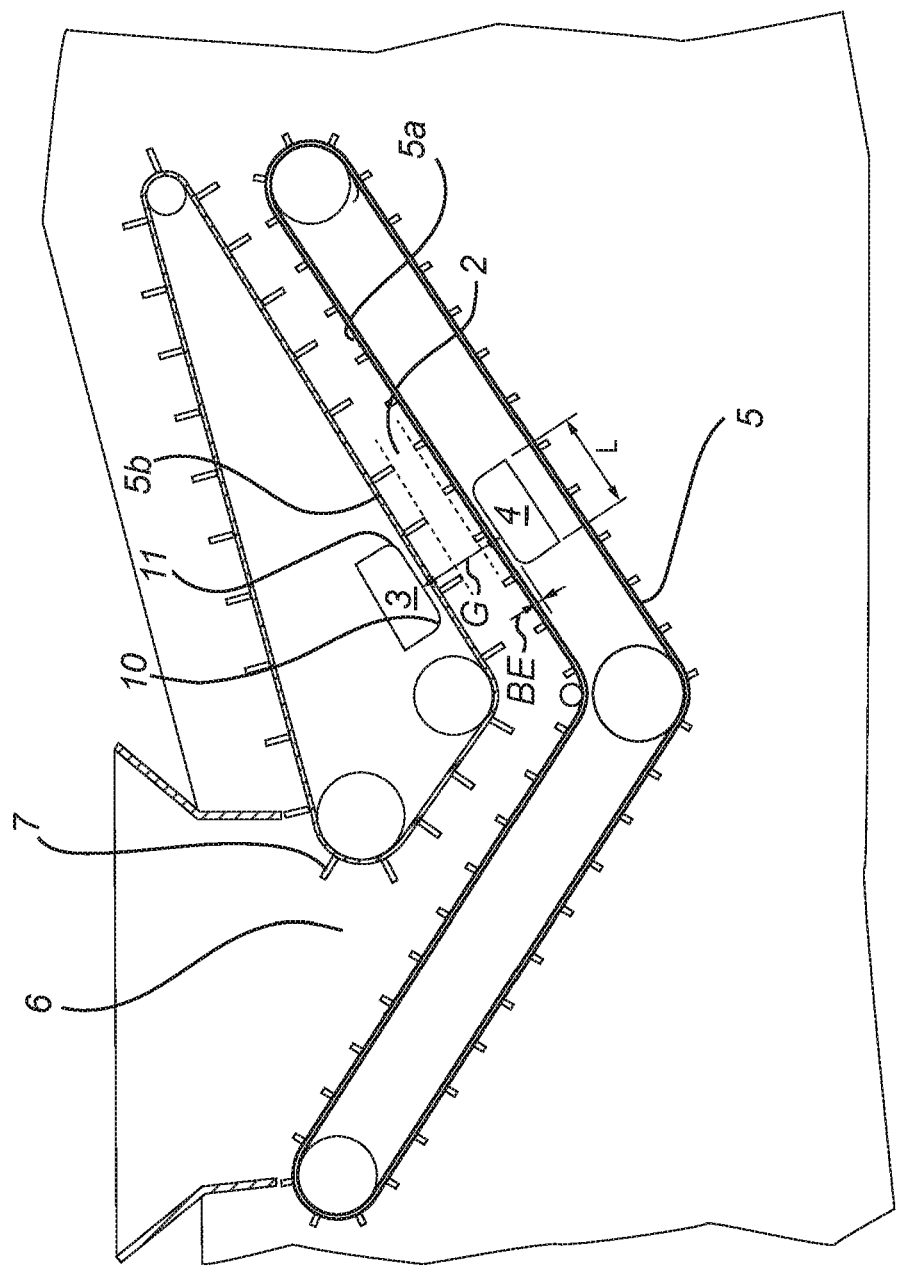

Furthermore, in FIG. 3 there is shown yet another embodiment of a PEF system 1 according to the present invention. In this case, the lower conveyor belt 5a is in a V shape and arranged from the inflow channel 6 and through the entire treatment channel 2. Moreover, the upper conveyor belt 5b is arranged in a triangular shape and as such also from the inflow channel 6 and over into the treatment channel 2.

The invention claimed is:

1. A pulsed electric field (PEF} system comprising;
a channel for PEF treatment of a material,
opposite electrode units, and
at least two conveyor belts, wherein said at least two conveyor belts are is arranged in the channel, in between the opposite electrode units and in close proximity to the opposite electrode units,
wherein said at least two conveyor belts are perforated or comprises one or more PEF perforated sections,
wherein a distance BE between one of the electrode units and a closest of the two conveyor belts is at most 0.1 G, where G is a distance between the opposite electrode units and
wherein a front electrode edge and a rear electrode edge of each of the opposite electrode units are rounded so that both the front electrode edges and the rear electrode edges of the opposing electrode units are rounded in a perpendicular direction to a flow direction, the flow direction being a direction which the material is moved through the system by the conveyor belts.

2. The PEF system according to claim 1, wherein said at conveyor belts each comprise a net, with an area of holes which is at least 40% of a total area of a corresponding conveyor belt.

3. The PEF system according to claim 1, wherein at least one of the conveyor belts has a thickness in a range of 0.5-5 mm.

4. The PEF system according to claim 1, wherein the channel for PEF treatment of the material is a longitudinal channel and wherein the opposite electrodes are arranged opposite each other on opposite sides of the channel.

5. The PEF system according to claim 1, wherein the PEF system also comprises an inflow channel to receive the material to be treated, and wherein the inflow channel is in flow communication with the channel for PEF treatment of the material.

6. The PEF system according to claim 5, wherein a flow through the channel for PEF treatment of the material is inclined upwards with respect to the inflow channel.

7. The PEF system according to claim 5, wherein a second of the two conveyor belts is arranged to transport the material to be treated in the inflow channel and in the channel for PEF treatment of the material.

8. The PEF system according to claim 1, wherein said conveyor belts have paddles.

9. The PEF system according to claim 1, wherein the rounded front electrode edges of the opposite electrode units are rounded with a radius in a range of 0.1-0.5 of the distance G.

10. The PEF system according to claim 1, wherein the distance G between the opposite electrode units is in a range of from 5-40 cm.

11. The PEF system according to claim 1, wherein each of the opposite electrode units has a length L, said length L being arranged in a longitudinal direction of the channel, and wherein the length L is in a range of 5-80 cm.

12. The PEF system according to claim 1, wherein the distance BE is at most 0.01 G.

13. The PEF system according to claim 1, wherein the opposite electrode units have a depth D perpendicular to a length L, and wherein the depth D is in a range of from 5-100 cm.

* * * * *